US00RE43357E

(19) United States
(12) Reissued Patent
Lin

(10) Patent Number: US RE43,357 E
(45) Date of Reissued Patent: May 8, 2012

(54) COLOR INTERPOLATOR AND HORIZONTAL/VERTICAL EDGE ENHANCER USING TWO LINE BUFFER AND ALTERNATING EVEN/ODD FILTERS FOR DIGITAL CAMERA

(75) Inventor: Tao Lin, Shanghai (CN)

(73) Assignee: Faust Communications, LLC, Las Vegas, NV (US)

(21) Appl. No.: 11/241,903

(22) Filed: Sep. 30, 2005

Related U.S. Patent Documents

Reissue of:
(64) Patent No.: 6,628,330
Issued: Sep. 30, 2003
Appl. No.: 09/432,366
Filed: Nov. 3, 1999

U.S. Applications:
(63) Continuation-in-part of application No. 09/388,318, filed on Sep. 1, 1999, now Pat. No. 6,642,962.

(51) Int. Cl.
*H04N 5/208* (2006.01)
*G06K 9/40* (2006.01)

(52) U.S. Cl. ..... 348/252; 382/266

(58) Field of Classification Search ..... 348/222.1, 348/252, 253, 254, 266, 271, 272, 273, 278, 348/279, 280, 289, 290, 336, 342, 625; 382/266, 382/272, 275, 300, 303, 304
See application file for complete search history.

(56) References Cited

U.S. PATENT DOCUMENTS 4,760,441 A 7/1988 Kohno
4,764,805 A 8/1988 Rabbani et al.
4,796,085 A 1/1989 Shinada
4,796,095 A 1/1989 Shinada
5,008,739 A 4/1991 D'Luna et al.
5,172,227 A 12/1992 Tsai et al.
5,260,774 A 11/1993 Takayama
5,262,849 A 11/1993 Mimura et al.
5,265,200 A 11/1993 Edgar
5,325,182 A 6/1994 Murata et al.
5,371,546 A 12/1994 Kitsuki
5,382,976 A 1/1995 Hibbard
5,396,441 A 3/1995 Ozawa
(Continued)

*Primary Examiner* — David Ometz
*Assistant Examiner* — Peter Chon

(57) ABSTRACT

A digital-camera processor receives a stream of mono-color pixels in a Bayer pattern from a sensor. Two lines of the pattern are stored in a 2-line buffer. Red, Blue, and Green interpolators receive a 3×3 array of pixels from the 2-line buffer. The interpolators generate missing color values by interpolation. For green, horizontal interpolation is performed for odd lines, while vertical interpolation is performed for even lines. Horizontal and vertical interpolation is thus alternated with alternate lines. Edge detection is performed at the same time as interpolation, on the green pixels from the 2-line buffer. An edge-detection filter is multiplied by the green pixels in the 3×3 array from the 2-line buffer. Different edge-detection filters are used for odd and even lines. These filters are modified to detect edges running perpendicular to the direction of the green interpolation filter. Edges in the same direction as the interpolation filter are ignored. Thus blurring caused by the green interpolation does not affect edge detection. The result of the edge-detection filter is compared to two different threshold values, one for green and one for red and blue. When an edge is detected, an edge enhancer is activated. The edge enhancer adds a scaled factor to the interpolated R, G, or B values to sharpen the detected edge. The line buffer stores only 2 full lines of pixels and no full-frame buffer is needed.

35 Claims, 9 Drawing Sheets

U.S. PATENT DOCUMENTS 5,414,465 A * 5/1995 Kodama et al. ..... 348/236
5,504,524 A 4/1996 Lu et al.
5,506,619 A 4/1996 Adams, Jr. et al.
5,528,292 A 6/1996 Ikeda ..... 348/222
5,579,047 A 11/1996 Yamagami et al.
5,596,367 A 1/1997 Hamilton, Jr. et al.
5,739,867 A 4/1998 Eglit
5,808,674 A 9/1998 Adams, Jr. et al.
5,821,999 A 10/1998 Barnsley et al.
5,886,797 A 3/1999 Shimura
5,887,085 A 3/1999 Otsuka
5,889,554 A 3/1999 Mutze
5,987,221 A 11/1999 Bearss et al.
6,346,969 B1 * 2/2002 Kwon ..... 348/273
6,421,084 B1 7/2002 Chang et al.
6,563,535 B1 * 5/2003 Anderson ..... 348/231.2
6,563,537 B1 * 5/2003 Kawamura et al. ..... 348/252
7,142,233 B1 * 11/2006 Ogawa et al. ..... 348/222.1

* cited by examiner

| | | | | | |
|---|---|---|---|---|---|
| RED 1,1 | GREEN 1,2 | RED 1,3 | GREEN 1,4 | RED 1,5 | GREEN 1,6 |
| GREEN 2,1 | BLUE 2,2 | GREEN 2,3 | BLUE 2,4 | GREEN 2,5 | BLUE 2,6 |
| RED 3,1 | GREEN 3,2 | RED 3,3 | GREEN 3,4 | RED 3,5 | GREEN 3,6 |
| GREEN 4,1 | BLUE 4,2 | GREEN 4,3 | BLUE 4,4 | GREEN 4,5 | BLUE 4,6 |
| RED 599,1 | GREEN 599,2 | RED 599,3 | GREEN 599,4 | RED 599,5 | GREEN 599,6 |
| GREEN 600,1 | BLUE 600,2 | GREEN 600,3 | BLUE 600,4 | GREEN 600,5 | BLUE 600,6 |

| | | | | | |
|---|---|---|---|---|---|
| RED 1,797 | GREEN 1,798 | RED 1,799 | GREEN 1,800 | | |
| GREEN 2,797 | BLUE 2,798 | GREEN 2,799 | BLUE 2,800 | | |
| RED 3,797 | GREEN 3,798 | RED 3,799 | GREEN 3,800 | | |
| GREEN 4,797 | BLUE 4,798 | GREEN 4,799 | BLUE 4,800 | | |
| RED 599,797 | GREEN 599,798 | RED 599,799 | GREEN 599,800 | | |
| GREEN 600,797 | BLUE 600,798 | GREEN 600,799 | BLUE 600,800 | | |

PRIOR ART

FIG. 2

RED, BLUE COLOR INTERPOLATION

| | | |
|---|---|---|
| R | 0 | R |
| 0 | 0 | 0 |
| R | 0 | R |

PATTERN 1

| | | |
|---|---|---|
| 0 | R | 0 |
| 0 | 0 | 0 |
| 0 | R | 0 |

PATTERN 2

| | | |
|---|---|---|
| 0 | 0 | 0 |
| R | 0 | R |
| 0 | 0 | 0 |

PATTERN 3

| | | |
|---|---|---|
| 0 | 0 | 0 |
| 0 | R | 0 |
| 0 | 0 | 0 |

PATTERN 4

| | | |
|---|---|---|
| .25 | 0 | .25 |
| 0 | 0 | 0 |
| .25 | 0 | .25 |

COEFF FOR PATTERN 1

FIG. 7A

| | | |
|---|---|---|
| 0 | .5 | 0 |
| 0 | 0 | 0 |
| 0 | .5 | 0 |

COEFF FOR PATTERN 2

FIG. 7B

| | | |
|---|---|---|
| 0 | 0 | 0 |
| .5 | 0 | .5 |
| 0 | 0 | 0 |

COEFF FOR PATTERN 3

FIG. 7C

| | | |
|---|---|---|
| 0 | 0 | 0 |
| 0 | 1 | 0 |
| 0 | 0 | 0 |

COEFF FOR PATTERN 4

FIG. 7D

| | | |
|---|---|---|
| G | 0 | G |
| 0 | G | 0 |
| G | 0 | G |

ODD LINE, EVEN PXL
EVEN LINE, ODD PXL

FIG. 8A

| | | |
|---|---|---|
| 0 | G | 0 |
| G | 0 | G |
| 0 | G | 0 |

ODD LINE, ODD PXL
EVEN LINE, EVEN PXL

FIG. 8B

GREEN COLOR INTERPOLATION

| | | |
|---|---|---|
| 0 | .5 | 0 |
| 0 | 1 | 0 |
| 0 | .5 | 0 |

COEFF FOR
ODD LINE

FIG. 8C

| | | |
|---|---|---|
| 0 | 0 | 0 |
| .5 | 1 | .5 |
| 0 | 0 | 0 |

COEFF FOR
EVEN LINE

FIG. 8D

GREEN EDGE DETECTION

| | | |
|---|---|---|
| -1/4 | 1/4 | -1/4 |
| -1/4 | 1 | -1/4 |
| -1/4 | 1/4 | -1/4 |

COEFF FOR
ODD LINE

FIG. 9A

| | | |
|---|---|---|
| -1/4 | -1/4 | -1/4 |
| 1/4 | 1 | 1/4 |
| -1/4 | -1/4 | -1/4 |

COEFF FOR
EVEN LINE

FIG. 9B

COLOR INTERPOLATOR AND HORIZONTAL/VERTICAL EDGE ENHANCER USING TWO LINE BUFFER AND ALTERNATING EVEN/ODD FILTERS FOR DIGITAL CAMERA

Matter enclosed in heavy brackets [ ] appears in the original patent but forms no part of this reissue specification; matter printed in italics indicates the additions made by reissue.

RELATED APPLICATION

This application is a continuation-in-part of the co-pending application for "Merged Pipeline for Color Interpolation and Edge Enhancment of Digital Images", U.S. Ser. No. 09/388,318, filed Sep. 1, 1999 *now U.S. Pat. No. 6,642,962*.

FIELD OF THE INVENTION

This invention relates to digital cameras, and more particularly to digital signal processing that integrates color interpolation with edge detection.

BACKGROUND OF THE INVENTION

Rapid improvements in digital cameras and lower costs occur today at an amazing rate. In a recent year, more digital cameras were sold than traditional film cameras. Images from digital cameras can be downloaded and stored on personal computers. Digital pictures can be converted to common formats such as JPEG and sent as e-mail attachments or posted to virtual photo albums on the Internet. Video as well as still images can be captured, depending on the kind of digital camera.

FIG. 1 is a block diagram for a typical digital camera. Light focused through a lens is directed toward sensor 12, which can be a charge-coupled device (CCD) array or a complementary metal-oxide-semiconductor (CMOS) sensor array. The light falling on the array generates electrical currents, which are amplified by analog amp 14 before being converted from analog to digital values by A/D converter 16. An 8, 9, or 10-bit mono-color pixel is output to processor 10. These mono-color pixels are in a Bayer-pattern as shown in FIG. 2. Each pixel is either a red, a blue, or a green intensity.

The R, G, or B digital values in the Bayer pattern are processed by processor 10 to generate red-green-blue (RGB) or luminance-chrominance YUV pixels. The RGB or YUV pixels can then be displayed on display 19 or compressed by compressor 18 and stored on disk 17 or on a solid-state memory. YUV pixels often have a 4:4:4 format, with 8 bits for each of 2 colors and for the luminance. RGB pixels have varying formats, such as 4, 5, 6, or 8 bits per color.

Sensor 12 detects red, blue and green colors. However, each array point in sensor 12 can detect only one of the three primary colors. Rather than outputting an RGB pixel, sensor 12 can output only a single-color pixel at any given time. For example, a line of pixels output by sensor 12 might have a red pixel followed by a green pixel. Another line might have alternating green and blue pixels.

Each pixel represents the intensity of one of the primary colors at a point in the sensor array. Thus a red pixel indicates the intensity of red light at a point, while a neighboring green pixel indicates the intensity of green light at the next point in the sensor array. Each pixel contains only one-third of the total color information.

The remaining color information is obtained by interpolation. The green intensity of a red pixel is calculated by averaging the green intensities of neighboring green pixels. The blue intensity for that red pixel is calculated by averaging or interpolating the nearest blue pixels. Processor 10 performs this color interpolation, calculating the missing primary-color intensities for each pixel location.

Processor 10 also may perform other enhancements to the image. Edges may appear fuzzy because the color interpolation tends to spread out features. These edges can be sharpened by detecting the edges and enhancing the color change at the edge to make the color transition more abrupt. Color conversion from RGB to YUV may also be performed by processor 10.

The electrical currents produced by the different primary colors can vary, depending on the sensor used and the wavelength and energy of the light photons. An adjustment known as a white-balance can be performed before processor 10, either on analog or digital values. Each primary color can be multiplied by a different gain to better balance the colors. Compensation can also be made for different lighting conditions, increasing all primary colors for dark pictures or decreasing all colors for bright pictures (overexposure).

Bayer Pattern—FIG. 2

FIG. 2 shows an image captured by a sensor that generates single-color pixels in a Bayer pattern. The example shows an 800×600 frame or image for display in the common super-VGA resolution. A total of 600 lines are captured by the sensor, with 800 pixels per line.

A personal computer displays full-color pixels that have all three primary-color intensities (RGB). In contrast, the sensor in a digital camera can detect only one of the three primary colors for each point in the 800×600 sensor array. Detectors for green are alternated with red detectors in the first line, while green detectors are alternated with blue detectors in the second line.

The first horizontal line and each odd line have alternating red and green detectors, so pixels output from these odd lines are in a R-G-R-G-R-G-R-G sequence. The second horizontal line and each even line have alternating green and blue detectors, so pixels output from these even lines are in a G-B-G-B-G-B-G-B sequence.

Half of the pixels are green pixels, while one-quarter of the pixels are read and the last quarter are blue. The green pixels form a checkerboard pattern, with blue and red pixels surrounded by green pixels. Since the human eye is more sensitive to green, the Bayer pattern has more green pixels than red or blue.

The green intensity for a red pixel location can be interpolated by averaging the four green pixels that surround the red pixel. For example, the green intensity for red pixel at location (3,3) is the sum of green pixels (3,2), (3,4), (2,3), and (4,3), divided by four. Likewise, the green intensity for a blue pixel location can be interpolated by averaging the four surrounding green pixels. For blue pixel (2,4), the interpolated green intensity is the sum of green pixels (2,3), (2,5), (1,4), and (3,4), divided by four.

The red and blue values for a green pixel location can also be calculated from the 2 red and 2 blue pixels that surround each green pixel. For green pixel (2,3), the interpolated red value is the average of red pixels (1,3) and (3,3) above and below the green pixel, while the interpolated blue value is the average of blue pixels (2,2) and (2,4) to the right and left of the green pixel.

Many different techniques have been used for color interpolation and white balance. See U.S. Pat. Nos. 5,504,524 and 5,260,774, which show white-balance from analog signals.

Sometimes a whole frame buffer is used for white balance or interpolation. Whole-frame buffers can be large, mega-pixel buffers that hold all 800×600 pixels. See, U.S. Pat. No. 5,260,774, FIGS. 1~3. Color and edge enhancement are often not performed or are performed by a separate unit, perhaps also using a whole-frame buffer.

While such digital-camera processors are useful, cost reduction is desirable since digital cameras are price-sensitive consumer devices. Whole-frame buffers require large memories, and as digital cameras are increased in resolution, larger memories are needed for the larger number of pixels.

Parent Application Used 4-Line Buffer and Column Register—FIG. 3

The parent application disclosed a merged interpolator and edge detector that required only a 4-line buffer. FIG. 3 shows a multi-function image processor using a 4-line buffer and a column register of the parent application. Light captured by sensor front-end 22 is converted to electrical signals by a charge-coupled or transistor device, and the electrical signals are converted from analog to digital format. The image sensor does not generate all three primary color components (RGB) for each pixel, but only produces one of the three color components per pixel. The colors produced alternate from pixel to pixel, and from line to line in a Bayer pattern as shown in FIG. 2. Typically one pixel with only one of the three primary colors is output for each clock cycle.

The sensitivity of the sensor to the different primary colors is not equal. Some colors experience more attenuation than others. Also, the image may be under or over exposed. White balancer 26 multiplies each pixel from front end 22 by a gain. Red pixels are multiplied by a red gain, blue pixels by a blue gain, and green pixels by a green gain. The pixel-gain product is output from white balancer 26 to line buffer 30.

The pixel gains may be pre-set gains, or may be calculated on the fly. Pre-set gains can be calculated at the factory for the sensor type and fixed gains stored in a register and applied to white balancer 26. Video digital cameras produce a series of frames, and still cameras are normally pointed toward the picture before shooting, so gain calculator 24 can generate a running average of all pixels for each of the 3 colors from one frame, and use the averages to calculate gains for the next frame. Averages can also be generated for just a portion of an image frame, and the gains applied to the entire image or a portion of the image.

Four-line buffer 30 contains about four lines of pixels, rather than all 600 or more lines. For SVGA resolution, each line contains 800 pixels, so line buffer 30 contains 800×4 or 3,200 pixels. These are single-color pixels of 12 bits per color, so the memory size is 38 K bits. Other resolutions, such as 1024×768 have more pixels per line, so the size of line buffer 30 can increase to 48K bits or more.

Interpolator 41 performs both horizontal and vertical interpolation to generate all three color components (R,G,B) for each pixel. Interpolation is performed by adding weighted color values from neighboring pixels of the desired color. Only the neighboring pixels that touch the current pixel location are added in the interpolation. There are a total of 8 such neighboring pixels—three pixels on three lines.

The interpolation weighting or filter varies by color, since there are twice as many green pixels in a Bayer pattern as there are red or blue pixels. The green pixels form a checkerboard pattern with green pixels on every line, but the red or blue pixels form a more open pattern with pixels only on alternating lines.

The interpolation filter for green is:

$$\begin{matrix} 1/8 & 1/4 & 1/8 \\ 1/4 & 1/2 & 1/4 \\ 1/8 & 1/4 & 1/8 \end{matrix}$$

which is a 3×3 kernel that can be separated into a 3×1 kernel and a 1×3 kernel:

$$\begin{bmatrix} 1/8 & 1/4 & 1/8 \\ 1/4 & 1/2 & 1/4 \\ 1/8 & 1/4 & 1/8 \end{bmatrix} = \begin{bmatrix} 1/4 \\ 1/2 \\ 1/4 \end{bmatrix} * [\,1/2 \quad 1 \quad 1/2\,]$$

The 3×1 kernel is implemented as a vertical interpolation step that multiplies the pixel above by ¼ and the pixel below by ¼, while the current pixel location is multiplied by ½. The 1×3 kernel becomes a horizontal interpolation step that multiplies the pixel on the left by ½ and the pixel to the right by ½, while the current pixel location is multiplied by 1. Since half of the locations in a Bayer pattern are missing green values, not all of the kernel coefficients are used to calculate a pixel's green value.

The interpolation filter for red and blue is:

$$\begin{matrix} 1/4 & 1/2 & 1/4 \\ 1/2 & 1 & 1/2 \\ 1/4 & 1/2 & 1/4 \end{matrix}$$

which is a 3×3 kernel that can be separated into a 3×1 kernel and a 1×3 kernel:

$$\begin{bmatrix} 1/4 & 1/2 & 1/4 \\ 1/2 & 1 & 1/2 \\ 1/4 & 1/2 & 1/4 \end{bmatrix} = \begin{bmatrix} 1/2 \\ 1 \\ 1/2 \end{bmatrix} * [\,1/2 \quad 1 \quad 1/2\,]$$

The 3×1 kernel is implemented as a vertical interpolation step that multiplies the pixel above by ½ and the pixel below by ½, while the current pixel location is multiplied by 1. The 1×3 kernel becomes a horizontal interpolation step that multiplies the pixel on the left by ½ and the pixel to the right by ½, while the current pixel location is multiplied by 1. Since only one-quarter of the locations in a Bayer pattern contain red (blue) values, not all of the kernel coefficients are used to calculate a pixel's red (blue) value.

Horizontal adders 40 perform the horizontal interpolation for green, red, and blue for a current pixel location and some of the immediately surrounding pixel locations. The results are stored in column register 32. Column register 32 contains color components for just one column. Horizontal adders 40 calculate the green components for 5 lines of this column, while red and blue components are calculated for only 3 lines of this column. Thus column register 32 stores color components for a small region of the image.

These color components are not complete, since only the horizontal kernel has been applied to the pixels from line buffer 30. Vertical adders 50 perform the vertical interpolation from the horizontal results stored in column register 32, using the vertical kernels for green and red/blue. All three color components for a current pixel are generated by vertical adders 50, and this RGB value is stored in RGB register 34. The current pixel is a pixel in the third of the four lines from line buffer 30, and in the column from column register 32.

The green components for the line above and line below the current pixel are also generated by vertical adders 50. Thus the green components are generated for three lines of the column stored in column register 32. The green values are stored in green register 34'.

The RBG value for the currently-processed pixel from RGB register 34 is converted to YUV format by YUV converter 60. Color enhancer 38 receives the 2 chromatic values (U and V) and multiplies these values by a filter value to enhance certain colors. The enhanced U and V value for the current pixel is then output for display, storage, or compression.

The green values from green register 34' are used for edge detection. The last set of green values for the previous 2 columns are stored in pipeline registers 64, so that a total of 9 green values are stored (three lines by three columns). An edge can be detected from the current (middle) pixel by comparison to the 8 surrounding pixels. When a difference above a threshold value is detected, and edge is signaled by edge detector 62. Edge enhancer 36 is then activated. Edge enhancer 36 receives the luminance (Y) value from YUV converter 60 for the current pixel, and simply outputs the Y value when no edge is detected. When edge detector 62 detects an edge, edge enhancer 36 multiplies the Y value by a filter to increase or decrease the brightness of the pixel, thereby enhancing or sharpening the edge.

The pipeline delay through pipeline registers 34' and edge detector 62 matches the pipeline delay through RGB register 34 and YUV converter 60, so that the same current pixel is edge detected and YUV-converted. Thus edge detection and YUV conversion occur simultaneously for the same pixel. Horizontal adders 40 and vertical adders 50 interpolate for both RGB-YUV conversion and edge detection. Green values are calculated for two additional lines so that edge detection can also be performed using the intermediate results. Edge enhancement and color enhancement are also performed at the same time on the same pixel by color enhancer 38 and edge enhancer 36.

By performing a few additional calculations, interpolator 41 provides inputs to edge detector 62 as well as the current RGB value. Simultaneous edge detection is then possible using the same pipeline. Edge detection is performed on the green values rather than on the Y values so that edge detection can occur earlier in the pipeline.

While the merged device of the parent application is useful, steep cost reductions in digital cameras has made it desirable to further reduce the cost of the device. It is desired to use even smaller buffers in the color interpolator. A merged color interpolator that performs both edge detection and color interpolation is desired that uses less than a 4-line buffer.

It is desired to reduce cost further by eliminating the white balancer, the YUV converter, and pipeline registers in the parent device. It is further desired to eliminate the column registers and RGB buffers in the parent device.

What is desired is a digital-camera processor that does not use a whole-frame buffer. It is still desired to perform color interpolation of Bayer-pattern pixels without storing all the pixels in a frame. It is desired to use only a few smaller line buffers, which store only a few lines of pixels rather than all 600 lines in a SVGA image. It is further desired to perform both color interpolation and edge detection at the same time, using integrated hardware. It is desired to merge the horizontal/vertical edge detector into the interpolator. It is desired to also perform both horizontal and vertical edge enhancement without using a whole-frame buffer. It is desired to process all pixels in a frame in a single pass, without storing all the pixels.

SUMMARY OF THE INVENTION

An alternating-line color interpolator and edge detector has an input for receiving a stream of mono-color pixels from an image sensor. A 2-line buffer is coupled to receive pixels from the input. It stores a full line of pixels and portions of 2 other lines of pixels. The 2-line buffer outputs a 3×3 region of pixels having 3 rows and 3 columns.

A red interpolator receives red pixels in the 3×3 region from the 2-line buffer. It averages the red pixels within the 3×3 region to generate an interpolated red pixel for a center location of the 3×3 region. A blue interpolator receives blue pixels in the 3×3 region from the 2-line buffer. It averages the blue pixels within the 3×3 region to generate an interpolated blue pixel for a center location of the 3×3 region. A green interpolator receives green pixels in the 3×3 region from the 2-line buffer. It averages the green pixels within the 3×3 region to generate an interpolated green pixel for a center location of the 3×3 region.

For odd lines the green interpolator averages only green pixels in a middle column of the 3×3 region when the center location is on an odd line. The green interpolator ignores green pixels in a left column to the left of the middle column and in a right column to the right of the middle column for odd lines. For even lines the green interpolator averages only green pixels in a middle row of the 3×3 region when the center location is on an even line. The green interpolator ignores green pixels in an upper row above the middle row and in a lower row below the middle row for even lines.

An edge detector receives green pixels in the 3×3 region from the 2-line buffer. It multiplies each green pixel by a filter coefficient and sums results to generate an edge value.

For odd lines, the filter coefficients for green pixels in a middle column have an opposite sign as filter coefficients for green pixels in the right and left column. Thus edges crossing the middle column are magnified more than vertical edges within the middle column for odd lines.

For even lines, the filter coefficients for green pixels in a middle row have an opposite sign as filter coefficients for green pixels in the upper and lower row. Thus edges crossing the middle row are magnified more than horizontal edges within the middle row for even lines. Vertical color interpolation and horizontal edge detection is performed for odd lines, but horizontal color interpolation and vertical edge detection is performed for even lines.

In further aspects of the invention diagonal edges that pass through the center location are detected by the edge detector for both odd and even lines. The mono-color pixels from the image sensor are arranged in a Bayer pattern.

In still further aspects the 2-line buffer has a storage capacity sufficient for two full lines of pixels but insufficient for three full lines of the pixels. Thus the 2-line buffer stores less than one percent of the whole image of pixels.

In other aspects the green color interpolator averages one or two green pixels for each center location, while the red and blue color interpolators each average one, two, or four red or blue pixels for each center location. Thus no more than two green pixels are averaged but up to four red or blue pixels are averaged.

BRIEF DESCRIPTION OF THE DRAWINGS

FIG. 2 shows an image captured by a sensor that generates single-color pixels in a Bayer pattern.

FIGS. 7A-D show red or blue color interpolation filter coefficients that alternate with the Bayer pattern.

FIGS. 8A-D show that the green interpolation coefficients alternate for even and odd lines.

FIGS. 9A-B show that the edge-detection filter coefficients for green are alternated for even and odd lines.

DETAILED DESCRIPTION

The present invention relates to an improvement in digital imaging. The following description is presented to enable one of ordinary skill in the art to make and use the invention as provided in the context of a particular application and its requirements. Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

The inventor has realized that cost can be further reduced by using a 2-line buffer before the color interpolator rather than a 4-line buffer. The 2-line buffer and a small temporary buffer can output 3 lines of pixels, allowing a 3×3 kernel to be used as a filter for color interpolation. Edge detection can also use a 3×3 kernel filter.

Edge detection can be performed simultaneously with green color interpolation in the same pipeline. This eliminates a separate RGB buffer between the color interpolator and the edge unit. Edge detection can be performed on just the green pixels, and not the red and blue pixels. Since there are twice as many green pixels as the other colors, greater detection accuracy is achieved using green.

The cost can be further reduced by removing the white balance and the YUV converter. Edge enhancement can be applied directly to the RGB pixels as they are output from the color interpolator.

Figure 1:
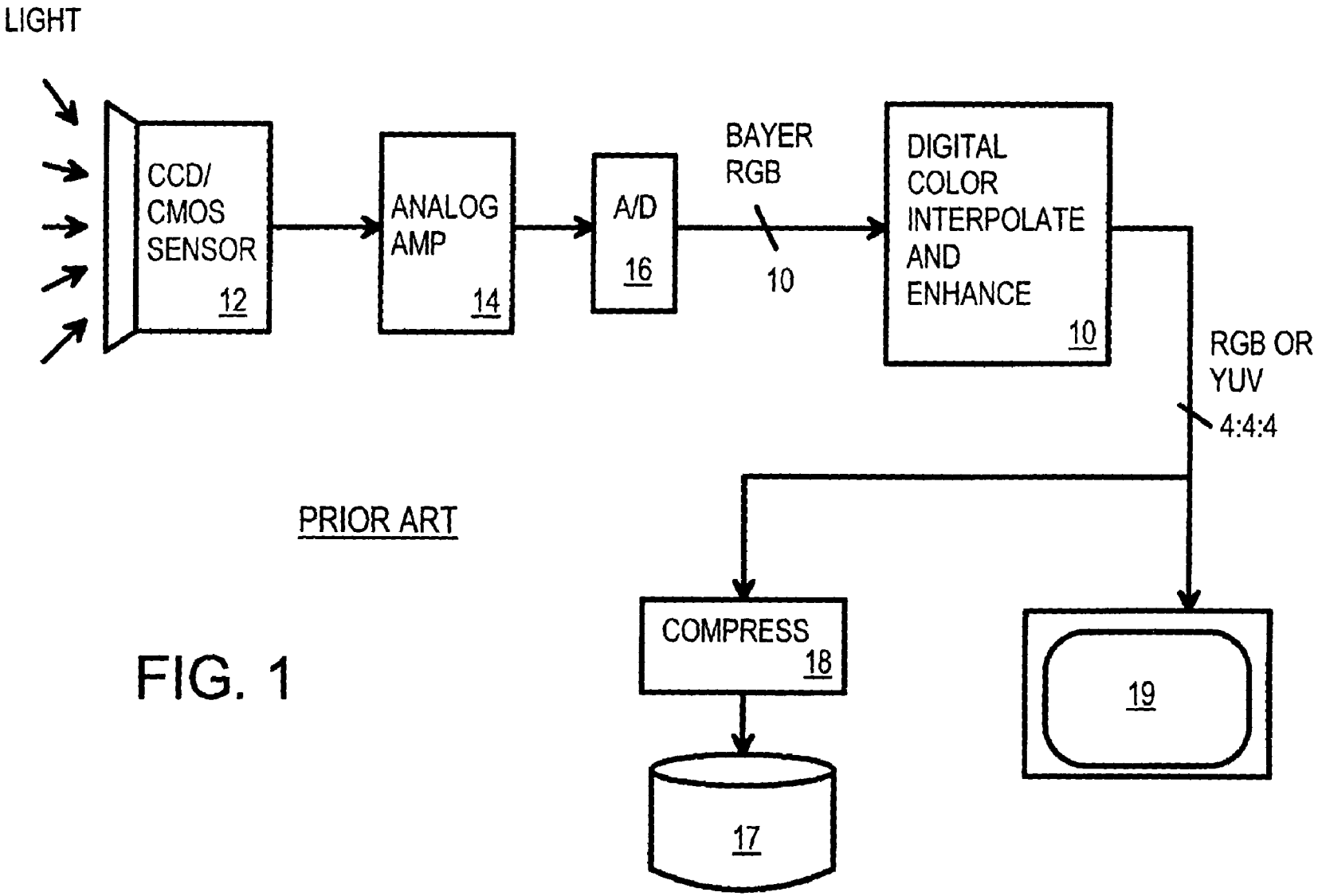
PRIOR ART FIG. 1
FIG. 1 is a block diagram for a typical digital camera.
Figure 3:
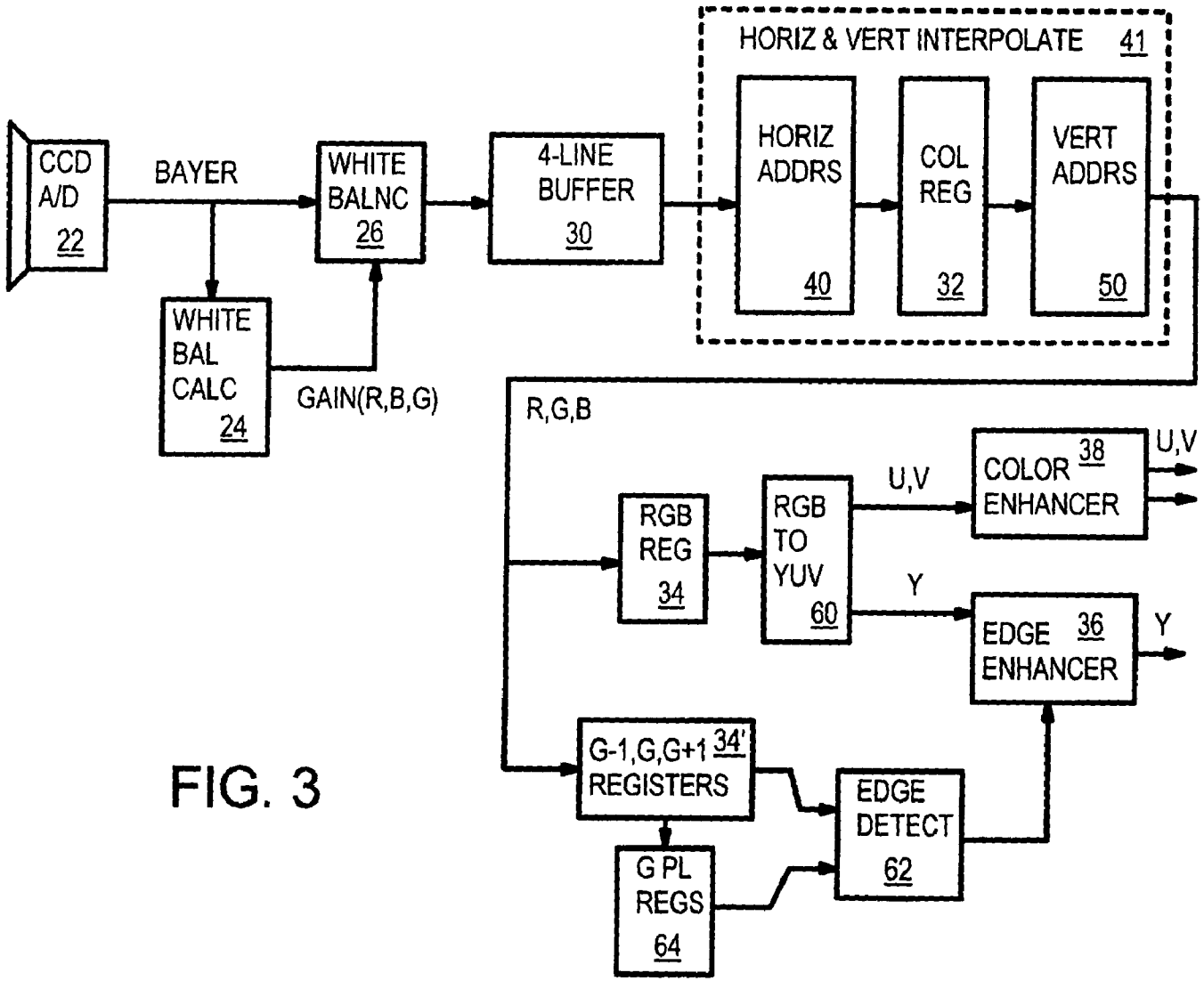
FIG. 3 shows a multi-function image processor using a 4-line buffer and a column register of the parent application.
Figure 4:
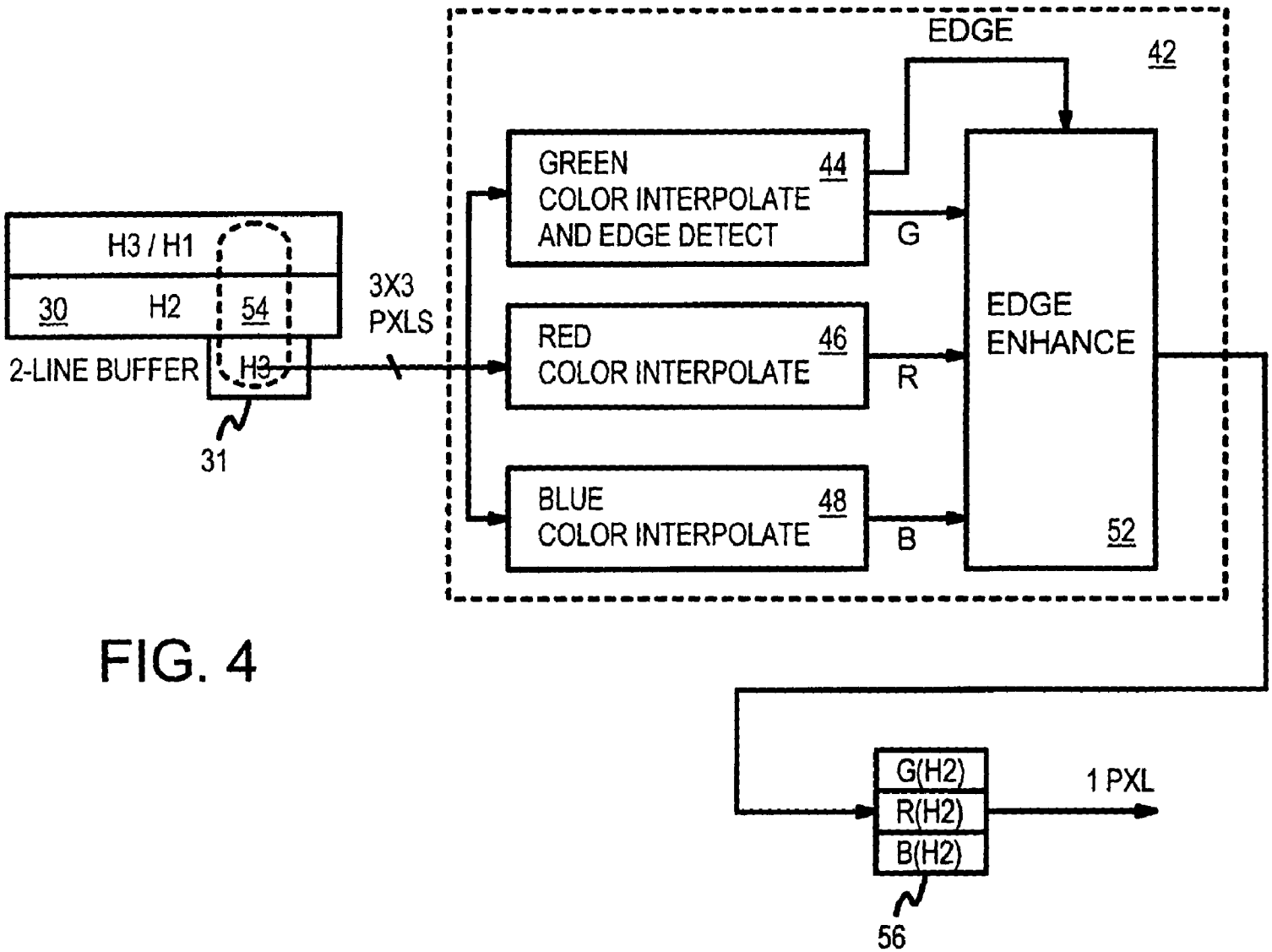
FIG. 4 shows a color interpolator and edge unit that uses only a 2-line buffer.

Merged Color Interpolator and Edge Detector With 2-Line Buffer-FIG. 4

FIG. 4 shows a color interpolator and edge unit that uses only a 2-line buffer. Two-line buffer 30 contains about two lines of pixels, rather than all 600 or more lines. For SVGA resolution, each line contains 800 pixels, so line buffer 30 contains 800×2 or 1,600 pixels. These are single-color pixels of 12 bits per color, so the memory size is. 19 K bits. Other resolutions, such as 1024×768 have more pixels per line, so the size of line buffer 30 can increase to 24K bits or more.

Interpolator 42 performs both horizontal and vertical interpolation to generate all three color components (R,G,B) for each pixel. Interpolation is performed by a weighted averaging of color values from neighboring pixels of the desired color. Only the neighboring pixels that touch the current pixel location are added in the interpolation. There are a total of 8 such neighboring pixels—three pixels on three lines.

Line buffer 30 is fed a stream of mono-color pixels from the sensor. These pixels arrive in a Bayer pattern, from left to right filling each line, and from upper lines to lower lines until the entire frame is received.

The most-recently-received two lines are stored in line buffer 30 for the preferred embodiment. Horizontal lines H1 and H2 have been stored in the two lines of line buffer 30. Horizontal line H3 is currently being received from the sensor. Pixels along line H3 replace line H1 pixels in the first row of line buffer 30. Thus pixels to the left of the first row are from line H3 while pixels to the right are from the older line H1.

A small overlapping region occurs in a current column 54. Pixels received from the sensor are first stored in a small temporary buffer 31 in line buffer 30. Temporary buffer 31 contains a few pixels that have just been received from the sensor. Pixels in the current column 54 and in the 2 surrounding columns of oldest line H1 are not discarded immediately, but instead are sent to interpolator 42. Using temporary buffer 31 to store new pixels from line H3 allows for 3 lines of pixels (H1 to H3) to be sent to interpolator 42 for current column 54. Pixels from oldest line H1 are discarded after being sent to interpolator 42.

Current column 54 includes the actual current column and two adjacent columns, for two horizontal lines. A region of 3×3 pixels is sent from line buffer 30 to interpolator 42 for each clock cycle. This 3×3 region provides enough pixels for interpolation of a current pixel location's RGB values. The 3×3 region is also used for edge detection by being input to an edge filter kernel. Thus edge detection values are also generated by interpolator 42.

The 3×3 region or array of pixels is sent from line buffer 30 to three interpolator units: green interpolator and edge detector 44, red interpolator 46, and blue interpolator 48. Red interpolator 46 averages any red pixels from the Bayer pattern in the 3×3 region to generate the interpolated red value for the center pixel on line H2. This center R pixel is output to edge enhancer 52. Likewise, Blue interpolator 48 averages any blue pixels from the Bayer pattern in the 3×3 region to generate the interpolated blue value B for the center pixel on line H2, which is also output to edge enhancer 52.

Green interpolator and edge detector 44 also averages any green pixels in the Bayer pattern in the 3×3 region to generate the G value for the center pixel on line H2. At the same time, a different filter kernel is applied to the G pixels in the input 3×3 region. This filter kernel exaggerates differences along an edge. The filter kernel is reduced to a single value, the EDGE value. The EDGE value is output to edge enhancer 52, as is the G pixel.

Edge enhancer 52 compares the absolute value of the EDGE value from green interpolator and edge detector 44 to a threshold. When the EDGE value exceeds the threshold, an edge has been detected. Edge enhancer 52 then adjusts pixel values for the R, G, and B center pixel. The adjusted pixel colors R, G, B are then output to RGB register 56 as the RGB value for the center pixel on line H2. RGB register 56 stores one pixel.

A single-pixel RGB register 56 is required, rather than a 2-line RGB buffer, since edge detection is performed on the Bayer-pattern G values, not on the interpolated G values. Since these Bayer-pattern G pixels are missing from every other pixel location, a special edge-detection filter is applied, as shown later in FIGS. 9A-B.

Figure 5:
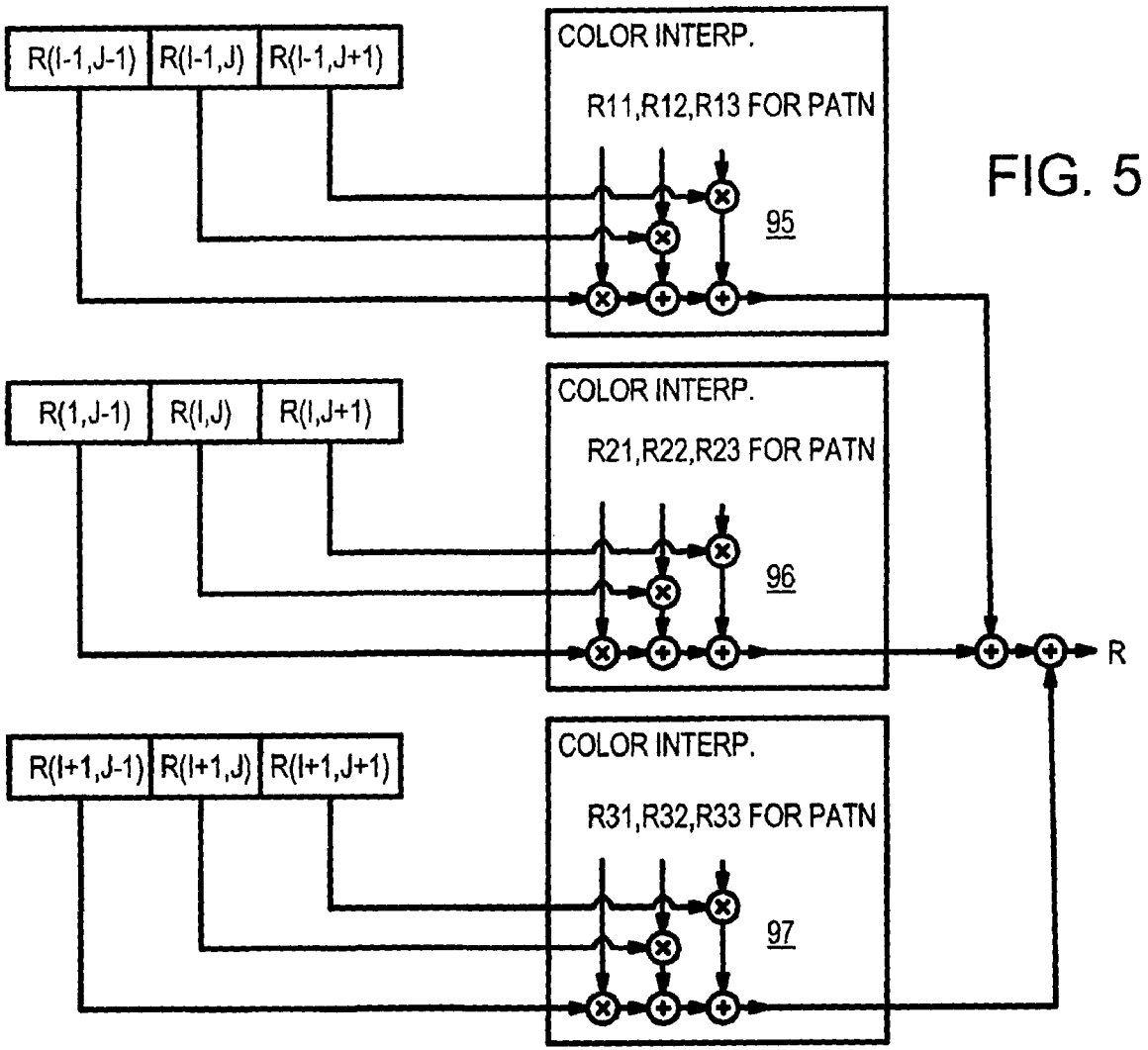
FIG. 5 shows a color interpolator for red pixels.

Red and Blue Color Interpolator—FIG. 5

FIG. 5 shows a color interpolator for red pixels. Red color interpolator 46 (FIG. 4) is shown, but blue color interpolator 48 operates in a similar fashion. The R pixels from the Bayer-patter input are input from the 2-line buffer (30 of FIG. 4). These pixels fit into a 3×3 region with pixel $R_{ij}$ being the center or current pixel for line i, column j of the image. Color interpolator 46 generates the interpolated R value for this center pixel. As pixels are processed, the 3×3 region shifts to the right and then down to the left side of the next line. The variables i and j can be incremented as pointers to the current pixel in the 2-line buffer.

Line interpolator 95 receives any R pixels on the first line (i~1, or H1). Filter coefficients R11, R12, R13 are multiplied with any corresponding R pixels on the first line, and the results summed. Since the Bayer pattern has R pixels in only one-quarter of all locations, only 2, 1, or 0 R pixels are present. Missing R pixels are input as a zero to line interpolator 95 and do not increase the sum.

Line interpolator 96 receives any R pixels in the current line i (H2). Filter coefficients R21, R22, R23 are multiplied by the R pixel values, or zero when no R pixel exists in that location of the Bayer pattern. The products are summed and output. Likewise, line interpolator 97 receives any R pixels in the third line i+1 (H3). Filter coefficients R31, R32, R33 are multiplied by the R pixel values, and the sum output.

The line sums from line interpolators 95, 96, 97 are then summed to generate a final sum. The final sum is the interpolated R value for the center pixel (i,j). The filter coefficients applied vary from pixel to pixel and line to line in a fixed sequence, according to the Bayer pattern, as shown in FIGS. 7A-D.

Figure 6:
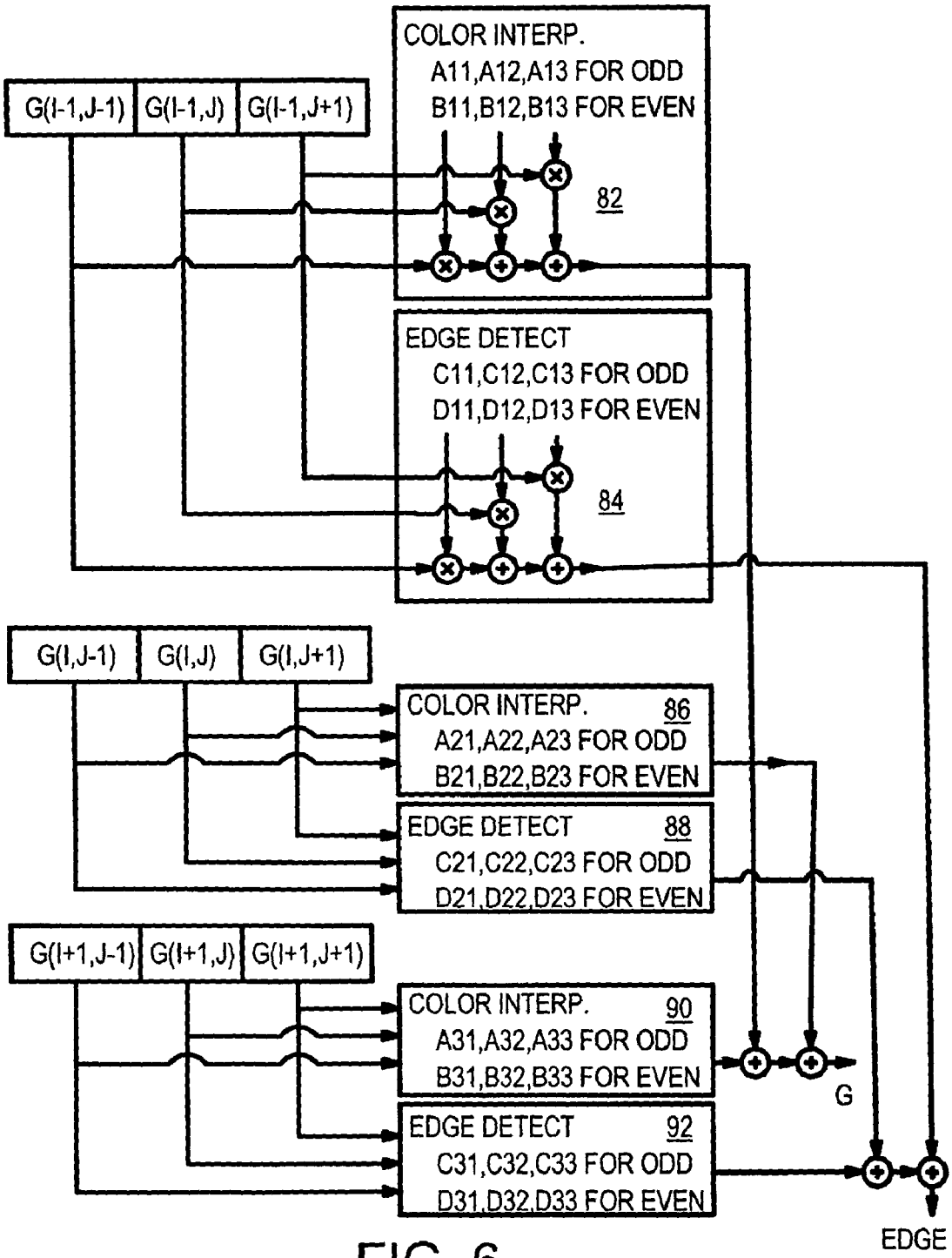
FIG. 6 illustrates the green color interpolator in parallel operation with the edge detector.

Green Interpolator and Edge Detector—FIG. 6

FIG. 6 illustrates the green color interpolator in parallel operation with the edge detector. Green interpolator and edge detector 44 receives a 3×3 region of G pixels from the Bayer pattern stored in line buffer 30. Green line interpolators 82, 86, 90 each receive a line of pixels, and multiply the G pixel values by filter coefficients.

The filter coefficients are alternated for even and odd lines, but the same set of coefficients are applied for all pixels within a line. For odd lines, coefficients A11, A12, A13 are multiplied by the first-line G values, but for even lines the coefficients are B11, B12, B13. The coefficients for even and odd lines are shown in more detail in FIGS. 8A-B.

The line sums from line interpolators 82, 86, 90 are summed to produce a final sum. The final sum is the interpolated G value for the center pixel at i,j on line H2.

Edge detectors 84, 88, 92 operate in parallel with color line interpolators 82, 86, 90 on the same Bayer-pattern G values from line buffer 30. Since edge detection is performed directly on the Bayer-pattern input, detection is not blurred by interpolation that averages pixels. However, special coefficient values are required for the edge filter. These coefficients are shown later in FIGS. 9A-B.

Edge detectors 84, 88, 92 each receive 1 or 2 G values for each 3-pixel line, and multiply them by coefficients before the results are summed. Coefficients C11, C12, C13 are multiplied by G values in the first line of the odd lines, while coefficients D11, D12, D13 are multiplied for even lines.

The summed results from edge detectors 84, 88, 92 are summed together to produce a final sum, the EDGE value. This EDGE value is the filter output of the edge kernel. When the absolute value of EDGE exceeds a threshold, edge enhancement is performed.

Red/Blue Coefficient Pattern13 FIGS. 7A-D

FIGS. 7A-D show red or blue color interpolation filter coefficients that alternate with the Bayer pattern. The Red pattern and coefficients are shown in FIGS. 7A-D, but a similar pattern occurs with an offset for blue. The same coefficients can be used for blue by matching the pattern.

In FIG. 7A, the red pixels are at the four corners of the 3×3 region. There are no red pixels in the Bayer pattern for the center (current) line. The coefficients applied to the red line interpolators are shown in the lower half of FIG. 7A. The four corner R values are multiplied by four (or right-shifted by two) and summed. The other locations are zero. Thus coefficients R11, R13, R31, R33 are 0.25 while the rest are 0.

When the current pixel location moves to the right by one column from pattern 1 in FIG. 7A, the pixels have pattern 2 shown in FIG. 7B. Red pixels are found in the 3×3 region of the Bayer pattern above and below the center pixel. The red coefficients are 0.5 for R12 and R32, while the rest are 0. The interpolated center pixel is thus the average of the pixels above and below it.

Patterns 1 and 2 alternate with successive pixels in the current line. On the next line, patterns 3 and 4 alternate. In pattern 3 (FIG. 7C), the current line has red pixels to the right and left of the current pixel, but no red pixels are in the lines above and below the current line. The red interpolation coefficients are 0.5 for R21 and R23, but zero elsewhere.

In FIG. 7D, the current pixel location has a red pixel in the Bayer pattern. There are no other R pixels in the 3×3 region. The R22 coefficient is 1.0 while the other coefficients are zero.

When the pixel values are set to zero for pixel locations that do not have red pixels in the Bayer pattern, the red interpolation coefficients can be fixed at the values:

$$\begin{bmatrix} R11 & R12 & R13 \\ R21 & R22 & R23 \\ R31 & R32 & R33 \end{bmatrix} = \begin{bmatrix} .25 & .5 & .25 \\ .5 & .1 & .5 \\ .25 & .5 & .25 \end{bmatrix}$$

Locations without red pixels then multiply the coefficient by the zero. The coefficients with non-zero pixels depend on the pattern.

Green Interpolation Coefficients Alternate for Even/Odd Lines—FIGS. 8A-B

FIGS. 8A-D show that the green interpolation coefficients alternate for even and odd lines. The green pixels are located in a checkerboard arrangement in the Bayer pattern. Green pixels are found on each line.

Since the green pixels are in a checkerboard pattern, the 3×3 region can have only 2 possible patterns. The pattern A of FIG. 8A occurs for odd pixels on even lines, and for even pixels on odd lines. This pattern A has a green pixel at the center and at the four corners. The pattern B of FIG. 8B occurs for odd pixels on odd lines, and for even pixels on even lines. This pattern B has green pixels to the right, left, and above and below the center, but there is no green pixel at the center.

The interpolation coefficients shown in FIG. 8C are applied to all pixels on odd lines. For odd pixels on odd lines, pattern B, there is no center pixel and thus the center (G22) coefficient is multiplied by zero. The green pixels above and below the center are multiplied by coefficients G12 and G32, which are both 0.5. Thus the pixels above and below are averaged. Note that the green pixels to the right and left of the center are ignored. Thus a vertical interpoiation but not a horizontal interpolation is performed for odd lines.

For even pixels on odd lines, pattern A, there are no pixels above and below the center and thus their coefficients (G12, G32) are multiplied by zero. The green pixel at the center is multiplied by coefficients G22, which is 1.0. Thus the center pixels is output without change. Note that the green pixels at the four corners are ignored. Thus no interpolation is performed.

The interpolation coefficients shown in FIG. 8D are applied to all pixels on even lines. For even pixels on even lines, pattern B, there is no center pixel and thus the center (G22) coefficient is multiplied by zero. The green pixels of the center are multiplied by coefficients G21 and G23, which are both 0.5. Thus the pixels to the right and left are averaged. Note that the green pixels above and below the center are ignored. Thus a horizontal interpolation but not a vertical interpolation is performed for even lines.

For odd pixels on even lines, pattern A, there are no pixels to the right and of the center and thus their coefficients (G21, G23) are multiplied by zero. The green pixel at the center is multiplied by coefficients G22, which is 1.0. Thus the center pixels is output without change. Note that the green pixels at the four corners are ignored. Thus no interpolation is performed.

The interpolation filter performs horizontal-only interpolation on even lines, but vertical-only interpolation on odd lines. Since only two pixels are averaged to generate a missing middle pixel, bluffing is minimized. Only one addition is required per pixel, yet the overall picture is interpolated in both horizontal and vertical directions. Each interpolation filter requires either no arithmetic operations (G in center), or one addition and one post-addition right-shift.

Edge-Detection Coefficients Alternate for Even and Odd Lines—FIGS. 9A-B

FIGS. 9A-B show that the edge-detection filter coefficients for green are alternated for even and odd lines. A generic edge detection filter is a 3×3 matrix with a one coefficient in the center, with the 8 surrounding coefficients being −⅛. This matrix increases the difference between the current pixel in the middle and the surrounding pixels. When an edge occurs, the difference in color to the surrounding pixels is magnified by the filter, aiding detection.

Since edge detection is performed only on green pixels, only the green color interpolations needs to be taken into account. The green color interpolation performs vertical interpolation for odd lines, but horizontal interpolation for even lines. This interpolation tends to spread out or blur horizontal edges for odd lines, but blurs vertical edges for even lines. The edge detection filter is modified to accommodate the blurred edges that result from green interpolation.

In FIG. 9A, the generic edge-detection filter is modified to account for blurring along the vertical direction for odd lines. The coefficients for the current column are positive while the coefficients for the other columns are negative. This magnifies edges that span the columns, the horizontal edges. The greatest magnification is the difference from the center pixel to the pixels to the right and left, since C21 and C23 are −¼ while C22 is 1. However, the edge filter does not magnify differences within the middle column, since the coefficients for the pixels above and below the center, C12 and C32, are +¼, the same sign as the center coefficient C22.

The corner coefficients C11, C13, C31, C33 are also set to −¼, which produces a magnification similar to C21 and C23. Thus the odd-line edge filter magnifies horizontal edges and diagonal edges. Vertical edges are enhanced to a lesser degree.

In FIG. 9B, the generic edge-detection filter is modified to account for blurring along the horizontal direction caused by the even-line interpolation filter. The coefficients for the current row are positive while the coefficients for the other rows are negative. This magnifies vertical edges that cross rows. The greatest magnification is the difference from the center pixel to the pixels above and below the center, since C12 and C32, are −¼ while C22 is 1.0. However, the edge filter does not magnify differences within the middle row, since the coefficients for the pixels to the right and left, C21 and C23, are +¼, the same sign as the center coefficient C22.

The corner coefficients C11, C13, C31, C33 are set to −¼, which produces the same magnification as C12 and C32, which are −¼. Thus the even-line edge filter magnifies vertical edges and diagonal edges. Horizontal edges are enhanced to a lesser degree.

Figure 10:
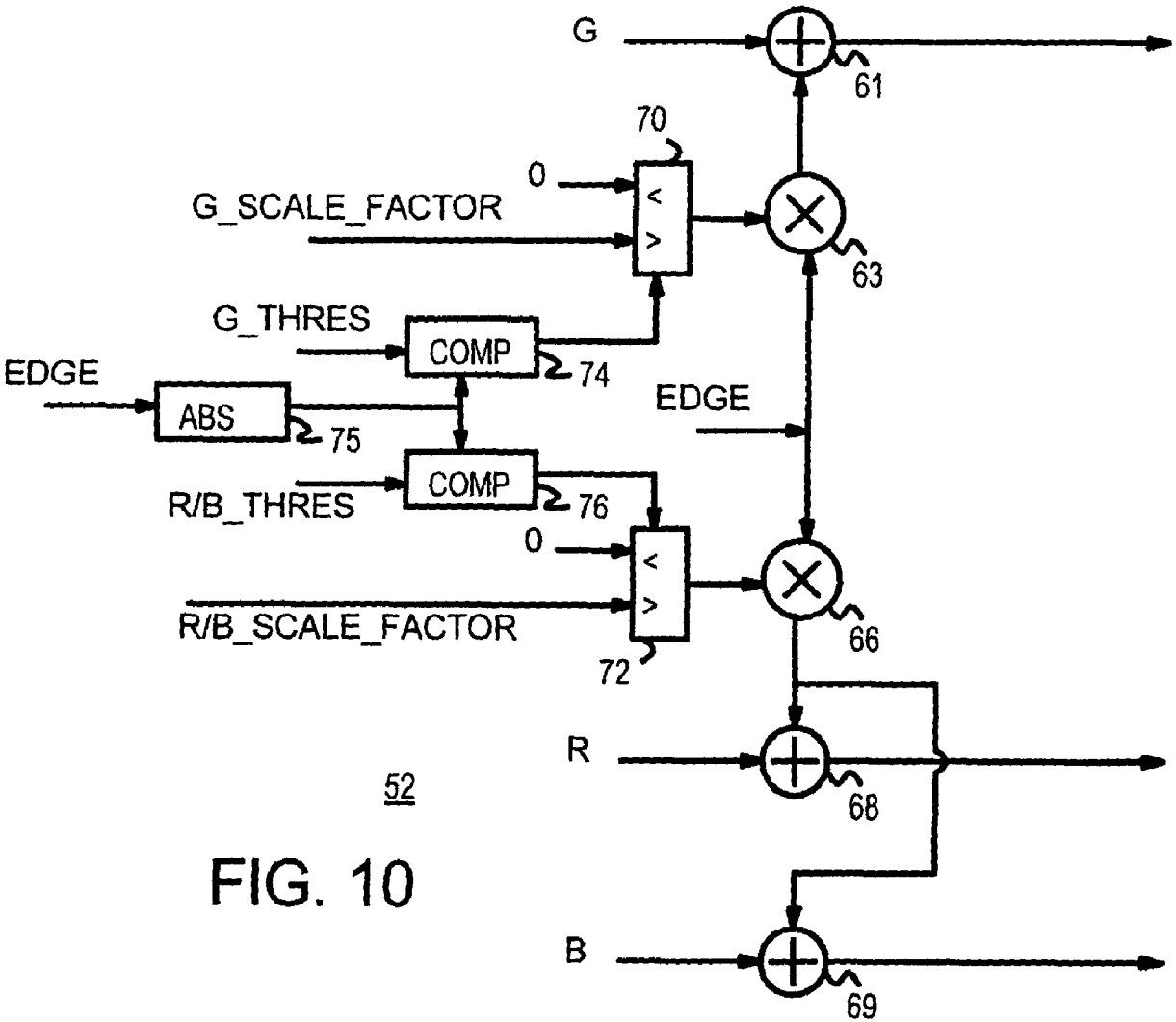
FIG. 10 is a diagram of an edge enhancer.

Edge Enhancement—FIG. 10

FIG. 10 is a diagram of an edge enhancer. Edge enhancer 52 receives the interpolated full-color R,G,B pixels from the interpolator for each pixel location. Edge enhancer 52 also receives the result of the green edge-detection filter, the value EDGE.

Absolute unit 75 generates the absolute value of EDGE, |EDGE|, and outputs the absolute value to comparators 74, 76. Comparator 74 compares |EDGE| to the green threshold value, G_THRES. When |EDGE| exceeds G_THRES, comparator 74 signals mux 70 to select the green scale factor G_SCALE_FACTOR for output to multiplier 63. Multiplier 63 multiplies the edge value EDGE by the green scale factor, and the product from multiplier 63 is added to the interpolated green value G by summer 61. Thus the green value is enhanced when an edge is detected.

When the edge value does not exceed the green threshold, mux 70 selects 0, and multiplier 63 outputs as zero to summer 61. The green value is passed through summer 61 without enhancement, since no edge was detected.

Rather than use the same green scaling factor and threshold, a separate threshold and scaling factor are used for red/blue. Comparator 76 compares |EDGE| to the red/blue threshold value R/B_THRES, and signals mux 72 to select zero when a sufficiently abrupt edge was not found. Summers 68, 69 add zero to the R, B values, and no enhancement is performed.

When an edge is detected, |EDGE| exceeds R/B_THRES and comparator 76 signals mux 72 to select the red/blue scaling factor R/B_SCALE_FACTOR, which is multiplied by the edge value EDGE in multiplier 66. The product of the scaling factor and the edge value is then added to the R and B pixel values by summers 68, 69. Enhanced red and blue pixels are then output.

Using separate thresholds and scaling factors for green and for red/blue is useful for images derived Bayer patterns. The Bayer pattern has twice as many green pixels are red or blue pixels, so a higher threshold or a smaller scaling factor can be used for green. This helps to balance colors near an edge.

ADVANTAGES OF THE INVENTION

A digital-camera processor does not use a whole-frame buffer. It performs color interpolation of Bayer-pattern pixels without storing all the pixels in a frame. A smaller 2-line buffer is used, which store only 2 lines of pixels rather than all 600 lines in a SVGA image. Both color interpolation and edge detection are performed at the same time, using integrated hardware. The edge detector is merged into the same pipeline as the interpolator. All pixels in a frame are processed in a single pass, without storing all the pixels.

Only 2 lines of the 600 or more lines need to be stored in the line buffer, providing a memory savings of better than 99%. The unified pipeline and line buffer can be integrated together on a single substrate. The chip can be all-digital since interpolation, edge detection and enhancement are all performed digitally. Since the edge detection is tightly integrated with the interpolation pipeline, a separate multi-line RGB buffer between the interpolator output and the edge-detector input is not needed.

The interpolation filters use as few pixels as possible to reduce blurring, the spreading of pixel values to nearby pixel locations. The green interpolation filter performs only vertical interpolation for odd lines and only horizontal interpolation for even lines, minimizing blurring. However, both horizontal and vertical interpolation are performed on the digital image, improving symmetry. Performing only vertical or horizontal interpolation at any location also has the advantage of requiring less hardware, since fewer pixel inputs are needed for averaging. Rather than full matrix-resolving hardware, only a simple adder and shifter can be used when the proper pixels and coefficients are input.

ALTERNATE EMBODIMENTS

Several other embodiments are contemplated by the inventor. The invention can also interpolating for locations that already have green values in the Bayer pattern. This produces a smoother color. The small temporary buffer in the line buffer can be expanded, and can receive either the newest pixels or the oldest pixels in the line buffer. The size of the line buffer can also be varied for different horizontal resolutions, and for different edge-detection areas.

Various logic segmentation and pipelines can be used, depending on logic delays in each pipestage. Rapid clocking and slow adders may require 2 clock cycles for each adder in the interpolator, or slower clocks and faster logic may allow more adders to operate in a single pipestage without actually latching in the intermediate values. Similar adjustments and modifications can be made to other stages and functional units.

Different data encodings and primary colors can be used. Bit widths can be varied. Many data formats may be used with the invention. Additional functions can be added. Many arrangements of adders, shifters, and logic units are possible. Adders may be reused or used recursively. Some image sensors may alter the Bayer pattern in different ways, such as by producing data from lower lines before upper lines. Various modifications can be made as needed.

The meaning of odd and even lines can be altered, depending on the physical image and the assignment of line numbers. Some images may start with line 0 rather than line 1, or the Bayer pattern can be shifted to the right or left or otherwise modified.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

I claim:

1. An alternating-line color interpolator and edge detector comprising:

an input for receiving a stream of mono-color pixels from an image sensor;

a 2-line buffer, coupled to receive pixels from the input, for storing a full line of pixels and portions of 2 other lines of pixels, the 2-line buffer outputting a 3×3 region of pixels having 3 rows and 3 columns;

a red interpolator, receiving red pixels in the 3×3 region from the 2-line buffer, for averaging the red pixels within the 3×3 region to generate an interpolated red pixel for a center location of the 3×3 region;

a blue interpolator, receiving blue pixels in the 3×3 region from the 2-line buffer, for averaging the blue pixels within the 3×3 region to generate an interpolated blue pixel for a center location of the 3×3 region;

a green interpolator, receiving green pixels in the 3×3 region from the 2-line buffer, for averaging the green pixels within the 3×3 region to generate an interpolated green pixel for a center location of the 3×3 region;

wherein for odd lines the green interpolator averages only green pixels in a middle column of the 3×3 region when the center location is on an odd line, the green interpolator ignoring green pixels in a left column to the left of the middle column and in a right column to the right of the middle column for odd lines;

wherein for even lines the green interpolator averages only green pixels in a middle row of the 3×3 region when the center location is on an even line, the green interpolator ignoring green pixels in an upper row above the middle row and in a lower row below the middle row for even lines; and an edge detector, receiving green pixels in the 3×3 region from the 2-line buffer, for multiplying each green pixel by a filter coefficient and for summing results to generate an edge value;

wherein for odd lines, the filter coefficients for green pixels in a middle column have an opposite sign as filter coefficients for green pixels in the right and left column, whereby edges crossing the middle column are magnified more than vertical edges within the middle column for odd lines;

wherein for even lines, the filter coefficients for green pixels in a middle row have an opposite sign as filter coefficients for green pixels in the upper and lower row, whereby edges crossing the middle row are magnified more than horizontal edges within the middle row for even lines, whereby vertical color interpolation and horizontal edge detection is performed for odd lines, but horizontal color interpolation and vertical edge detection is performed for even lines.

2. The alternating-line color interpolator and edge detector of claim 1 wherein diagonal edges that pass through the center location are detected by the edge detector for both odd and even lines.

3. The alternating-line color interpolator and edge detector of claim 1 wherein the mono-color pixels from the image sensor are arranged in a Bayer pattern.

4. The alternating-line color interpolator and edge detector of claim 3 wherein the 2-line buffer has a storage capacity sufficient for two full lines of pixels but insufficient for three full lines of the pixels; and wherein the 2-line buffer stores less than one percent of the whole image of pixels.

5. The alternating-line color interpolator and edge detector of claim 4 wherein the center location is in the middle row and in the middle column.

6. The alternating-line color interpolator and edge detector of claim 5 wherein the green color interpolator averages one or two green pixels for each center location, while the red and blue color interpolators each average one, two, or four red or blue pixels for each center location, whereby no more than two green pixels are averaged but up to four red or blue pixels are averaged.

7. The alternating-line color interpolator and edge detector of claim 5 wherein the absolute value of the filter coefficient for the center location is at least four times larger than a value of any other of the filter coefficients.

8. The alternating-line color interpolator and edge detector of claim 3 further comprising:

an edge enhancer, receiving the edge value from the edge detector, the edge enhancer altering the interpolated green pixel when an edge absolute value being an absolute value of the edge value exceeds a green threshold, p1 whereby detected edges are enhanced.

9. The alternating-line color interpolator and edge detector of claim 8 wherein the edge enhancer further comprises:

a first comparator for comparing the edge absolute value to the green threshold, for activating a green multiplier when the edge absolute value exceeds the green threshold;

a second comparator for comparing the edge absolute value to a red/blue threshold, for activating a red/blue multiplier when the edge absolute value exceeds the red/blue threshold, the red/blue multiplier altering the interpolated red pixel and the interpolated blue pixel when the edge absolute value exceeds the red/blue threshold, whereby different edge thresholds are compared for green and for red/blue pixels.

10. The alternating-line color interpolator and edge detector of claim 9 wherein the green multiplier multiplies the edge value with a green scale factor and a green summer adds a product from the green multiplier to the interpolated green pixel for adjustment;

wherein the red/blue multiplier multiplies the edge value with a red/blue scale factor and a red summer adds a product from the red/blue multiplier to the interpolated red pixel while a blue summer adds the product from the red/blue multiplier to the interpolated blue pixel for adjustment, whereby different scaling factors are used for green and for red/blue.

11. A digital-image processor comprising:

a line buffer, receiving mono-color pixels captured by an image sensor, the line buffer for storing only a fraction of a whole frame of an image, the fraction being less than 1 percent of a number of pixels in the whole frame;

a merged pipeline, receiving an array of mono-color pixels from the line buffer, for generating missing color values for a middle pixel, the middle pixel being a mono-color pixel in a middle of the array from the line buffer;

wherein for odd lines, primary-color pixels in a middle column of the array are averaged to generate a primary-color pixel in the middle of the array while primary-color pixels in other columns are ignored;

wherein for even lines, primary-color pixels in a middle row of the array are averaged to generate a primary-color pixel in the middle of the array while primary-color pixels in other rows are ignored;

an edge detector, receiving primary-color pixels in the array of mono-color pixels from the line buffer, for detecting an edge between the middle pixel and a neighboring pixel; and an edge enhancer, activated by the edge detector when the edge is detected, for increasing a magnitude of the middle pixel when the edge is detected;

the merged pipeline outputting interpolated color values for the middle pixel, whereby interpolation and edge detection are performed by the merged pipeline using the line buffer.

12. The digital-image processor of claim 11 wherein a primary color is green, the primary color pixels are green pixels, and the mono-color pixels are red, green, or blue color values representing a color of a pixel.

13. The digital-image processor of claim 12 wherein the merged pipeline further comprises:

a horizontal interpolator, activated for even lines but not activated for odd lines, receiving the array from the line buffer, for averaging primary-color pixels within a same horizontal line to produce a missing color value of the primary color for the middle pixel; and a vertical interpolator, activated for odd lines but not activated for even lines, receiving the array from the line buffer, for averaging primary-color pixels within a same vertical column to produce a missing color value of the primary color for the middle pixel;

whereby primary color pixels are horizontally interpolated for even lines but vertically interpolated for odd lines.

14. The digital-image processor of claim 13 wherein the array received by the merged pipeline from the line buffer shifts by one pixel to the right along a line for each clock cycle, the array containing at 3 columns of mono-color pixels from 3 lines;

wherein the line buffer stores 2 lines of mono-color pixels.

15. The digital-image processor of claim 14 wherein the edge detector comprises:

an odd-line filter, activated when the middle pixel is on an odd line, for multiplying each primary-color pixel in the array by a filter coefficient and summing products to generate an edge result;

wherein filter coefficients for the middle column have an opposite sign as filter coefficients for other columns of the array; and an even-line filter, activated when the middle pixel is on an even line, for multiplying each primary-color pixel in the array by a filter coefficient and summing products to generate an edge result;

wherein filter coefficients for the middle row have an opposite sign as filter coefficients for other rows of the array, whereby filter coefficients have a vertical arrangement for odd lines but a horizontal arrangement for even lines.

16. The digital-image processor of claim 5 wherein the odd-line filter detects more vertical and diagonal edges than horizontal edges, while the even line filter detects more horizontal and diagonal edges than vertical edges, whereby the edge detector is directional for alternate lines.

17. The digital-image processor of claim 16 wherein the mono-color pixels captured by the image sensor form a Bayer pattern, the Bayer pattern having alternating red and green mono-color pixels on odd lines, and alternating green and blue mono-color pixels on even lines, wherein the primary color pixels are green pixels.

18. An alternating interpolator comprising:

line buffer means, coupled to receive pixels in a Bayer pattern, for storing lines of pixels, the line buffer means outputting a 3×3 region of pixels having 3 rows and 3 columns;

red interpolate means, receiving red pixels in the 3×3 region from the line buffer means, for averaging the red pixels within the 3×3 region to generate an interpolated red pixel for a center location of the 3×3 region;

blue interpolate means, receiving blue pixels in the 3×3 region from the line buffer means, for averaging the blue pixels within the 3×3 region to generate an interpolated blue pixel for a center location of the 3×3 region;

green interpolate means, receiving green pixels in the 3×3 region from the line buffer means, for averaging the green pixels within the 3×3 region to generate an interpolated green pixel for a center location of the 3×3 region;

green-odd means for averaging green pixels in a middle column of the 3×3 region when the center location is on an odd line, the green-odd means excluding green pixels in a left column to the left of the middle column and in a right column to the right of the middle column for odd lines;

green-even means for averaging green pixels in a middle row of the 3×3 region when the center location is on an even line, the green-even means excluding green pixels in an upper row above the middle row and in a lower row below the middle row for even lines; and edge detect means, receiving green pixels in the 3×3 region from the line buffer means, for multiplying each green pixel by a filter coefficient and for summing results to generate an edge value;

wherein for odd lines, the filter coefficients for green pixels in a middle column have an opposite sign as filter coefficients for green pixels in the right and left column, whereby edges crossing the middle column are detected but vertical edges within the middle column are less detected for odd lines;

wherein for even lines, the filter coefficients for green pixels in a middle row have an opposite sign as filter coefficients for green pixels in the upper and lower row, whereby edges crossing the middle row are detected but horizontal edges within the middle row are less detected for even lines, whereby vertical color interpolation and horizontal edge detection is performed for odd lines, but horizontal color interpolation and vertical edge detection is performed for even lines.

19. The alternating interpolator of claim 18 wherein the green color interpolate means averages one or two green pixels for each center location, while the red and blue color interpolate means each average one, two, or four red or blue pixels for each center location, whereby no more than two green pixels are averaged but up to four red or blue pixels are averaged.

20. The alternating interpolator of claim 19 further comprising:

edge enhance means, receiving the edge value from the edge detect means, for altering the interpolated green pixel when an absolute value of the edge value exceeds a green threshold, whereby detected edges are enhanced.

*21. An apparatus for processing a digital image formed by a total number of pixels, wherein said digital image includes a plurality of lines, said apparatus comprising:*

*a line buffer configured to store pixel values, wherein each pixel value is indicative of color information for a corresponding pixel of said digital image, and wherein said line buffer has a capacity for storing a maximum number of pixel values that is less than said total number of pixels of said digital image;*

*a red color interpolator for receiving said pixel values from said line buffer;*

*a blue color interpolator for receiving said pixel values from said line buffer;*

*a green color interpolator for receiving said pixel values from said line buffer; and*

*an edge-detection unit;*

*wherein said red color interpolator, said blue color interpolator, and said green color interpolator are configured to generate additional color information corresponding to one or more of said pixels comprising said digital image;*

*and wherein said edge-detection unit is configured to output greater edge magnification values for horizontal edges than for vertical edges on one of said plurality of lines of said digital image, and wherein said edge-detection unit is configured to output greater edge magnification values for vertical edges than for horizontal edges on a different one of said plurality of lines of said digital image.*

*22. An apparatus for processing a digital image comprising a plurality of lines of pixels, said apparatus comprising:*

*a line buffer configured to store pixel values for a subset of said plurality of lines of pixels, wherein each pixel value is indicative of color information for a corresponding pixel of said digital image;*

*a plurality of color interpolators configured to receive said pixel values from said line buffer, wherein said plurality of color interpolators are configured to generate additional color information from said pixels values received from said line buffer; and*

*an edge enhancement unit, wherein said edge enhancement unit is configured to enhance horizontal edges more than vertical edges for one of said plurality of lines of pixels, wherein said edge enhancement unit is configured to enhance vertical edges more than horizontal edges for a different one of said plurality of lines of pixels, and wherein said edge enhancement unit is configured to enhance edges based on edge magnification values.*

*23. The apparatus of claim 22, further comprising an edge detection unit configured to detect one or more edges within said digital image and to generate edge magnification values for the one or more edges.*

*24. The apparatus of claim 23, wherein said at least one of said plurality of color interpolators is configured to alternate between horizontal interpolation and vertical interpolation for successive lines of pixels within said digital image.*

*25. The apparatus of claim 23, wherein, for said one of said plurality of lines of pixels, said edge detection unit is configured to output edge magnification values for vertical edges that are greater in magnitude than edge magnification values for horizontal edges.*

*26. The apparatus of claim 25, wherein, for said different one of said plurality of lines of pixels, said edge detection unit is configured to output edge magnification values for horizontal edges that are greater in magnitude than edge magnification values for vertical edges.*

*27. The apparatus of claim 23, wherein said edge detection unit is configured to detect diagonal edges for said one of said plurality of lines of pixels and said different one of said plurality of lines of pixels.*

*28. The apparatus of claim 22, wherein at least one of said plurality of color interpolators is configured to use horizontal interpolation but not vertical interpolation for generating said additional color information for one of said plurality of lines of pixels, and wherein said at least one of said plurality of color interpolators is configured to use vertical interpolation but not horizontal interpolation for generating said additional color information for a different one of said plurality of lines of pixels.*

*29. The apparatus of claim 23, wherein said edge detection unit is configured to generate the edge magnification values for the one or more edges based on edge coefficients having differing polarities.*

*30. The apparatus of claim 22, wherein for one a plurality of colors corresponding to the plurality of color interpolators, said edge enhancement unit is configured to enhance edges for that color using a scaling value, and wherein said*

*edge enhancement unit is configured to enhance edges for a different one the plurality of colors using a different scaling value.*

*31. A digital camera, comprising:*

*a line buffer configured to store pixel values for a subset of a total number of lines in a digital image, wherein each of said pixel values stored in said line buffer includes red color information, blue color information, or green color information;*

*a red interpolation unit configured to receive pixel values from said line buffer, wherein said red interpolation unit is configured to generate red color information from said pixel values received from said line buffer;*

*a blue interpolation unit configured to receive pixel values from said line buffer, wherein said blue interpolation unit is configured to generate blue color information from said pixel values received from said line buffer;*

*a green interpolation unit configured to receive pixel values from said line buffer, wherein said green interpolation unit is configured to generate green color information from said pixel values received from said line buffer;*

*an edge detection unit configured to receive pixel values from said line buffer, wherein said edge detection unit is configured to use green color information but not red color information or blue color information in order to generate one or more edge values; and*

*an edge enhancement unit configured to receive color information from said red interpolation unit, said blue interpolation unit, and said green interpolation unit, and an edge value from said edge detection unit.*

*32. The digital camera of claim 31, wherein said edge enhancement unit is configured to compare said edge value to a red-blue threshold value, wherein if said edge value exceeds said red-blue threshold value, said edge enhancement unit is configured to output enhanced red and blue pixel values based at least in part upon a red-blue scaling factor.*

*33. The digital camera of claim 32, wherein said edge enhancement unit is configured to compare said edge value to a green threshold value, wherein if said edge value exceeds said green threshold value, said edge enhancement unit is configured to output one or more enhanced green pixel values based at least in part upon a green scaling factor.*

*34. The digital camera of claim 33, wherein said red-blue scaling factor is different from said green scaling factor.*

*35. The digital camera of claim 31, wherein said green interpolation unit and said edge detection unit are configured to operate concurrently on a first set of pixel values received from said line buffer.*

* * * * *

UNITED STATES PATENT AND TRADEMARK OFFICE

CERTIFICATE OF CORRECTION

PATENT NO. : RE43,357 E
APPLICATION NO. : 11/241903
DATED : May 8, 2012
INVENTOR(S) : Lin

It is certified that error appears in the above-identified patent and that said Letters Patent is hereby corrected as shown below:

In Column 1, Line 17, delete “Enhancment” and insert -- Enhancement --, therefor.

In Column 3, Line 4, delete “1~3.” and insert -- 1-3. --, therefor.

In Column 9, Line 10, delete “(i~1,” and insert -- (i-1, --, therefor.

In Column 9, Line 62, delete “Pattern13 FIGS.” and insert -- Pattern - FIGS. --, therefor.

In Column 10, Line 59, delete “interpoiation” and insert -- interpolation --, therefor.

In Column 10, Line 65, delete “pixels” and insert -- pixel --, therefor.

In Column 11, Line 14, delete “pixels” and insert -- pixel --, therefor.

In Column 11, Line 20, delete “bluffing” and insert -- blurring --, therefor.

In Column 13, Line 6, delete “interpolation” and insert -- interpolations --, therefor.

In Column 15, Line 7, in Claim 8, before “whereby” delete “p1”.

In Column 16, Line 39, in Claim 16, delete “claim 5” and insert -- claim 15 --, therefor.

In Column 18, Line 64, in Claim 30, delete “one a” and insert -- one of a --, therefor.

In Column 19, Line 2, in Claim 30, delete “one the” and insert -- one of the --, therefor.

Signed and Sealed this
Twenty-seventh Day of November, 2012

David J. Kappos

David J. Kappos
*Director of the United States Patent and Trademark Office*